(12) United States Patent
Goomansingh et al.

(10) Patent No.: US 9,967,389 B2
(45) Date of Patent: May 8, 2018

(54) SYSTEM AND METHOD FOR SELECTABLE ALTERATION OF OPERATION AND APPEARANCE OF A PORTABLE COMPUTING DEVICE

(71) Applicant: PROUDLION IT LTD., Pickering (CA)

(72) Inventors: Kyle Sanjay Goomansingh, Pickering (CA); Meera Sati Chatoorgoon, Pickering (CA); Mona Deowattee Goomansingh, Winnipeg (CA)

(73) Assignee: PROUDLION IT LTD., Pickering, Ontario (CA)

( * ) Notice: Subject to any disclaimer, the term of this patent is extended or adjusted under 35 U.S.C. 154(b) by 0 days. days.

(21) Appl. No.: 15/654,609

(22) Filed: Jul. 19, 2017

(65) Prior Publication Data
US 2017/0324857 A1    Nov. 9, 2017

Related U.S. Application Data

(63) Continuation-in-part of application No. 14/234,869, filed as application No. PCT/GB2013/051570 on Jun. 17, 2013.

(60) Provisional application No. 61/663,601, filed on Jun. 24, 2012.

(51) Int. Cl.
*G08B 29/00*     (2006.01)
*H04M 1/725*    (2006.01)
*H04M 1/22*      (2006.01)
*H04W 4/12*      (2009.01)
*H04W 72/04*    (2009.01)
*H04B 1/04*       (2006.01)

(52) U.S. Cl.
CPC .......... *H04M 1/72547* (2013.01); *H04B 1/04* (2013.01); *H04M 1/22* (2013.01); *H04W 4/12* (2013.01); *H04W 72/04* (2013.01)

(58) Field of Classification Search
CPC ...... H04M 1/72547; H04M 1/22; H04W 4/14
USPC .......... 340/506, 539.11, 691.1, 815.4, 384.1; 455/566, 73; 713/100
See application file for complete search history.

(56) References Cited

U.S. PATENT DOCUMENTS

| | | | |
|---|---|---|---|
| 8,769,431 B1* | 7/2014 | Prasad | G06F 3/048 715/764 |
| 9,436,478 B2* | 9/2016 | Lee | H04M 1/72522 |
| 2012/0159139 A1* | 6/2012 | Kim | H04M 1/72563 713/2 |

* cited by examiner

*Primary Examiner* — Phung Nguyen
(74) *Attorney, Agent, or Firm* — Guy Levi; The IP Law Firm of Guy Levi, LLC (57) ABSTRACT

The disclosure relates to systems, methods and devices for secure routing and recording of network data streams passing through a network switch. Specifically, the disclosure relates to systems, methods and devices for reversibly deconstructing networks' OSI L2/L3/L4/L7 in time and space, in the process of selectively recording network data streams for secure access.

20 Claims, 5 Drawing Sheets

SYSTEM AND METHOD FOR SELECTABLE ALTERATION OF OPERATION AND APPEARANCE OF A PORTABLE COMPUTING DEVICE

CROSS REFERENCE TO RELATED APPLICATIONS

This application is a continuation in part of U.S. application Ser. No. 14/234,869 filed Jan. 24, 2014, which is a § 371 National Phase Application of PCT/GB2013/051570 filed Jun. 17, 2013, claiming priority from U.S. Provisional application No. 61/663,601 filed Jun. 24, 2012, all which are incorporated herein by reference in their entirety.

COPYRIGHT NOTICE

A portion of the disclosure hereinbelow contains material that is subject to copyright protection. The copyright owner has no objection to the reproduction by anyone of the patent document or the patent disclosure as it appears in the Patent and Trademark Office patent files or records, but otherwise reserves all copyright rights whatsoever

BACKGROUND

The disclosure is directed to a personalized appearance or "skin" for a portable computing device, such as a smartphone. Specifically, the disclosure is directed to an application, whereby the user at each environmental circumstance can adjust various parameters and then, switch between routine mode, or a default one and an altered mode which serves as a selectably starting point for any additional alterations.

The conventional mobile device includes a display and a keypad for facilitating data entry by the user. Usage of mobile, or portable computing devices under certain environmental circumstances, such as darkened environment, where silence is expected or needed, is obtrusive due the lighting of the screen and other factors.

The profile (or 'skin') used in portable computing devices generally refers to any number of preloaded settings applied to the mobile device. For example, mobile devices such as wireless telephones typically have configurable and/or adjustable features, such as ringing volume, ringing tones, ringing modes, and so forth. Depending on the particular situation where the mobile/portable computing device is used, the user may want to change those settings.

Moreover, regardless of the environmental circumstances requiring the profile change, such as a darkened hall, or the necessity for silencing certain features, it may still be necessary to be able to personalize the profile for the specific requirements of the user. Moreover, the changes may need to take place without connectivity or be applied without external prompt, but rather through user selected actuation.

These and other advantages of the technology are addressed by the following disclosure, figures and claims.

SUMMARY

Disclosed, in various embodiments, are systems, methods and devices for selectably personalizing a portable and/or mobile computing device, such as a smartphone. Specifically, the disclosure relates to systems, methods and processor-readable media for altering operating characteristics and aggregating applications on a portable and/or mobile computing device using an ad-hoc software application through a touch screen display.

In an embodiment provided herein is a system for selectably simultaneously altering operation and appearance of a portable computing device, the system comprising: the portable computing device comprising a touch screen display with a variable lighting module, a frequency alteration module, a processor and a non-volatile memory, wherein the processor is in electronic communication with the touchscreen display module, the frequency alteration module and the non-volatile memory and wherein the non-volatile memory having thereon a set of processor-readable instructions configured, when executed to cause the processor to: receive a first mode alteration request using a first actuation object; selectably aggregate a plurality of email applications; selectably aggregate a plurality of messaging systems; selectably aggregate a plurality of social network applications; selectably alter backlight level on the touchscreen display; selectably alter font on the touchscreen display; selectably alter frequency mode; accept alterations and/or aggregations using a second actuation object; and implement the mode alteration using a third actuation object.

In another embodiment, in a portable computing device comprising a touch screen display with a variable lighting module, a frequency alteration module, a processor and a non-volatile memory, wherein the processor is in electronic communication with the touchscreen display module, the frequency alteration module and the non-volatile memory and wherein the non-volatile memory having thereon a set of processor-readable instructions, provided herein is a method performed at least in part on at least the processor, comprising: receiving, from a first actuation object, a request for a mode alteration; selectably aggregating a plurality of email applications; selectably aggregating a plurality of messaging systems; selectably aggregating a plurality of social network applications; selectably altering backlight level on the touchscreen display; selectably altering font on the touchscreen display; selectably altering frequency mode; using a second actuation object, accepting alterations and/or aggregations; and implementing the mode alteration using a third actuation object.

In yet another embodiment, provided herein is a processor readable media, comprising a set of instructions, that when executed cause a processor of a portable and/or mobile commuting device to receive a first mode alteration request using a first actuation object; selectably aggregate a plurality of email applications; selectably aggregate a plurality of messaging systems; selectably aggregate a plurality of social network applications; selectably alter backlight level on the touchscreen display; selectably alter font on the touchscreen display; selectably alter frequency mode; accept alterations and/or aggregations using a second actuation object; and implement the mode alteration using a third actuation object.

These and other features of the systems, methods and the processor-readable media for altering operating characteristics and aggregating applications on a portable and/or mobile computing device, will become apparent from the following detailed description when read in conjunction with the figures and examples, which are exemplary, not limiting.

BRIEF DESCRIPTION OF THE FIGURES

For a better understanding of the systems, methods and the processor-readable media for altering operating characteristics and aggregating applications on a portable and/or mobile computing device, with regard to the embodiments thereof, reference is made to the accompanying examples and figures, in which.

DETAILED DESCRIPTION

Provided herein are embodiments of systems, methods and the processor-readable media for altering operating characteristics and aggregating applications on a portable and/or mobile computing device using an ad-hoc software application through a touch screen display.

Generally, the present disclosure relates to software applications on a communications device, and more particularly, to systems, methods and the processor-readable media for altering operating characteristics and aggregating applications on a portable and/or mobile computing device using an ad-hoc software application through a touch screen display, for execution on the communications device.

The application (also referred to as "app", in other words—a shortening of the term "application software"), can be regarded as a computer program designed to run on portable and/or mobile computing devices, such as, for example, smartphones, tablet computers, and other mobile devices. Apps are usually available through application distribution platforms, and are typically operated by the owner of the mobile operating system, such as the Apple® App Store, Google® Play, Windows® Phone Store, and BlackBerry® App World.

Therefore, provided herein is a system for selectably, simultaneously altering operation and appearance of a portable computing device, the system comprising: portable computing device 100 (See e.g., FIG. 1B) comprising touch screen display 103, user interface module 102, with a variable lighting module, a frequency alteration module, a processor and a non-volatile memory, wherein the processor is in electronic communication with touchscreen display 103 module, the frequency alteration module and the non-volatile memory and wherein the non-volatile memory having thereon a set of processor-readable instructions configured, when executed to cause the processor to: receive a first mode alteration request using a first actuation object; selectably aggregate a plurality of email applications; selectably aggregate a plurality of messaging systems; selectably aggregate a plurality of social network applications; selectably alter backlight level on the touchscreen display; selectably alter font on the touchscreen display; selectably alter frequency mode; accept alterations and/or aggregations using a second actuation object; and implement the mode alteration using a third actuation object.

The term "system" shall be taken to include any collection of systems or sub-systems or modules that individually or jointly execute a set, or multiple sets, of instructions to perform one or more functions.

As indicated, mobile device 100 has at least one user interface element 102, such as a keypad, input buttons or a touch screen. The at least one user interface element 102 can additionally be configured to have variable intensity lighting (see e.g., 112, FIG. 2), such that the intensity of the backlight provided to touch-screen display 103 can be manually adjusted by a user or automatically adjusted once manually selected, using the app in order to suit different environmental conditions personalized to the user preferences. In addition, device 100 can also have an audio module and a haptic output module. The haptic output module can have, for example an eccentric rotating mass (ERM) motor providing variable vibration effect and can be configured to be incorporated into the frequency alteration mode. In an embodiment, software on device 100 and the app, can be configured to act as a conversion layer for the haptic effects output by the frequency alteration module.

A frequency alteration module having selectable frequency modes can be coupled to, or be in electric communication with the mobile device and is configured to selectably change the output mode of the mobile device from audial to tactile (haptic) mode and vice versa or the combination thereof, whereas audial (in other words, sound) output can be provided by an audio device, such as a speaker and haptic, or tactile output is preferably provided by a variable vibration device, such as ERM motor. Accordingly and in another embodiment, the frequency alteration module is configured to enable selection between a first frequency mode and a second frequency mode, and wherein the first frequency mode provides an audio signal and the second frequency mode provides a haptic output signal. The several selectable frequency modes of the frequency alteration module can be changed either manually by the user or automatically using the app software, once the selection is made manually in order to suit different environmental conditions.

The term "module" is used herein to refer to software computer program code and/or any hardware or circuitry utilized to provide the functionality attributed to the module. Further, the term "module" or "component" can also refer to software objects or routines that execute on the computing system. The different components, modules, engines, and services described herein may be implemented as objects or processes that execute on the computing system (e.g., as separate threads).

Figure 1A:
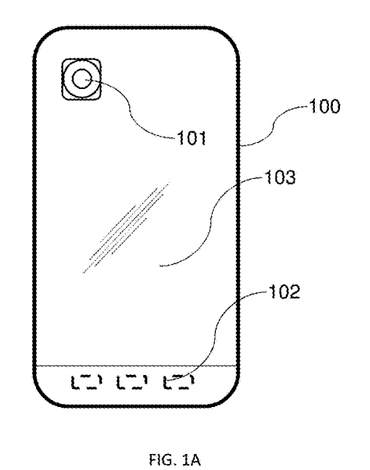
FIG. 1A is a simplified illustration of an embodiment of the initial touch-screen display before launching the application, with FIG. 1B illustrating an embodiment of the initial menu for selectable altering the operation and aggregating various applications into a single screen.

As illustrated in FIG. 1A, the first actuation object used in systems, methods and the processor-readable media for altering operating characteristics and aggregating applications on portable and/or mobile computing device 100 using an ad-hoc software application through touch screen display 103 provided herein, can be application launcher object 101 on touchscreen display 103. As illustrated, device 100 may further comprise user interface 102.

A typical selection mode as used herein, can be a selection mode that displays a menu and allows a user to execute a function associated with the touched menu element. A shortcut icon (e.g., 101 FIG. 1A) is a selection mode that replaces or augments a menu with a sub menu icon associated with the touched menu item and along the lines discussed herein. It is noted that the shortcut icon can also be an element in another sub menu, for example, as an accessibility sub-menu in the settings major menu of the computing device's operating system. Similarly, the launcher icon can be a dedicated launcher from the computing device's operating systems "settings" menu.

The selection modes may selectable from a top level of a menu stack, and/or may be selectable from a sub menu of the menu stack. The terms "application launcher" and "launcher" refers to an application's title or icon displayed to the user, along with links to functional code (such as located in the computing device's operating system), which together allow the user to identify an application title, and to select and open it. Likewise, the term "object" should be generally understood as meaning content presented on a display. Examples of objects include, but are not limited to, may refer to any type of content, including but not limited to images, videos, captions, text blocks or boxes, user-interface elements (e.g., launcher icons), clickable links, newsfeed stories, references to other objects (e.g., icons for other apps), advertisements, calendar events, units for displaying open graph analysis that may be graphically rendered, applications, websites, web pages, books, chapters.

It is further noted, that unless and until the first actuation object is actuated, the application does not run in the background. In other words, no priority is given to the app in the non-volatile memory of the device. In other words:

Application does not run in background------->YES

Indicating the app will exit when suspended by the operating system or user and re-start from the initial launching screen when the app is re-launched.

In an embodiment, (See e.g., FIG. 3) implementing the mode alteration and/or aggregation of a plurality of applications in the systems, methods and the processor-readable media described herein, can comprise displaying object(s) corresponding to each email application, each messaging system, and each social network application on the touchscreen display in a single screen with selectable order for each aggregated application.

Furthermore, the set of processor-readable instructions can be configured, when executed to further cause the processor to selectably order location each aggregated email application, each aggregated messaging system, and each aggregated social network application on the touchscreen display.

Figure 1B:
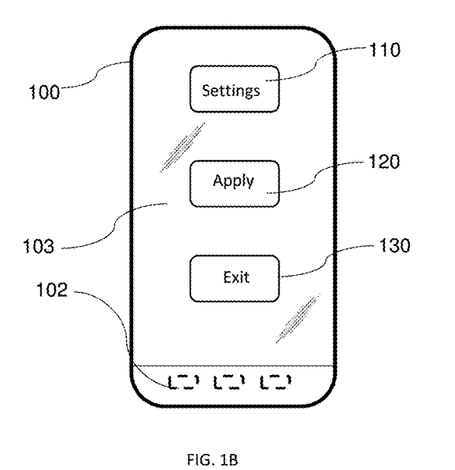

Operational mode alteration are illustrated in FIGS. 1A, 1B, 2, and 5, whereby a user can launch (or re-launch) app launcher 101 icon (or first actuation object, or "button") on touchscreen display 103 of device 100, and arrive at sub menu, comprising second actuation object 110 (see e.g., FIG. 1B). As illustrated in FIG. 1B, there are several objects displayed, each associated with launching a sub-routine of the app causing the processor to performs the necessary tasks. For example, second actuation object 110 (e.g., "Settings") which may be used to initially display the operational modes to be selectably (in other words, without affecting the operation of other parameters) altered, or in any subsequent launch (since the app will not run in the background), display the altered modes according to the last alteration.

An embodiment for causing a processor to affect the mode alteration can be, for example:

```
import android.app.Activity;
import android.content.Context;
import android.os.Bundle;
import android.view.View;
import android.view.ViewGroup;
import android.view.Window;
```

-continued

```
import android.view.animation.AnimationUtils;
import android.widget.AdapterView;
import android.widget.BaseAdapter;
import android.widget.CheckBox;
import android.widget.Gallery;
import android.widget.Gallery.LayoutParams;
import android.widget.ImageSwitcher;
import android.widget.ImageView;
import android.widget.ViewSwitcher;
public class Test extends Activity implements
     AdapterView.OnItemSelectedListener, ViewSwitcher.ViewFactory {
  CheckBox plain_cb;
  CheckBox serif_cb;
  CheckBox italic_cb;
  CheckBox bold_cb;
  @Override
  public void onCreate(Bundle savedInstanceState) {
    super.onCreate(savedInstanceState);
    requestWindowFeature(Window.FEATURE_NO_TITLE);
    setContentView(R.layout.main);
    setTitle("ImageShowActivity");
    mSwitcher = (ImageSwitcher) findViewById(R.id.switcher);
    mSwitcher.setFactory(this);
    mSwitcher.setInAnimation(AnimationUtils.loadAnimation(this,
       android.R.anim.fade_in));
    mSwitcher.setOutAnimation(AnimationUtils.loadAnimation(this,
       android.R.anim.fade_out));
    Gallery g = (Gallery) findViewById(R.id.gallery);
    g.setAdapter(new ImageAdapter(this));
    g.setOnItemSelectedListener(this);
  }
  public void onItemSelected(AdapterView parent, View v, int position,
     long id) {
    mSwitcher.setImageResource(mImageIds[position]);
  }
  public void onNothingSelected(AdapterView parent) {
  }
  public View makeView( ) {
    ImageView i = new ImageView(this);
    i.setBackgroundColor(0xFF000000);
    i.setScaleType(ImageView.ScaleType.FIT_CENTER);
    i.setLayoutParams(new ImageSwitcher.LayoutParams(
       LayoutParams.FILL_PARENT, LayoutParams.FILL_PARENT));
    return i;
  }
  private ImageSwitcher mSwitcher;
  public class ImageAdapter extends BaseAdapter {
    public ImageAdapter(Context c) {
      mContext = c;
    }
    public int getCount( ) {
      return mThumbIds.length;
    }
    public Object getItem(int position) {
      return position;
    }
    public long getItemId(int position) {
      return position;
    }
    public View getView(int position, View convertView,
       ViewGroup parent) {
      ImageView i = new ImageView(mContext);
      i.setImageResource(mThumbIds[position]);
      i.setAdjustViewBounds(true);
      i.setLayoutParams(new Gallery.LayoutParams(
         LayoutParams.WRAP_CONTENT, LayoutParams.
         WRAP_CONTENT));
      i.setBackgroundResource(R.drawable.icon);
      return i;
    }
    private Context mContext;
  }
  private Integer[ ] mThumbIds = { R.drawable.icon,
    R.drawable.icon, };
  private Integer[ ] mImageIds = { R.drawable.icon,
    R.drawable.icon };
}
```

```
//main.xml
<?xml version= "1.0" encoding="utf-8"?>
<RelativeLayout
        xmlns:android="http://schemas.android.com/apk/res/android"
        android:layout_width,"fill_parent"
        android:layout_height,"fill_parent">
    <ImageSwitcher
    android:id,"@+id/switcher"
        android:layout_width,"fill_parent"
        android:layout_height,"fill_parent"
        android:layout_alignParentTop,"true"
        android:layout_alignParentLeft,"true" />
    <Gallery android:id,"@+id/gallery"
    android:background="#55000000"
        android:layout_width,"fill_parent"
        android:layout_height,"60dp"
        android:layout_alignParentBottom,"true"
        android:layout_alignParentLeft,"true"
        android:gravity,"center_vertical"
        android: spacing,"16dp" />
</RelativeLayout>
```

Likewise, the following algorithm can be used in the systems and methods described for adjust the color of the aggregated applications text on the screen as well as the intensity of the color. Also listed is an embodiment of code for the type of response required from user as well as what would constitute an error, for example to tell the user what is too dark and as well as the ability to use different languages. Furthermore, the code provides the ability to link the color and intensity simultaneously as described and claimed herein:

```
<?xml version="1.0" encoding="utf-8"?>
<resources>
<string name-"xposed_description">Add a filter to your screen</string>
<!-- About -->
<string name="about_author"><![CDATA[<b>tonymanou</b> (<b>tony78960</b> on XDA)]]></string>
<string name="about_translation">Translation:</string>
<string name="about_translator"></string>
<string name="about_thread">Support thread:</string>
<string name="about_source">Source code:</string>
<string name="about_libraries">Used libraries:</string>
<!-- Toolbox -->
<string name="filter_off">OFF</string>
<!-- Filter settings -->
<string name="dim_filter">Darkening filter</string>
<string name="color_filter">Color filter</string>
<string name="transparency">Transparency:</string>
<string name="min_transparency">Minimum:</string>
<string name="max_transparency">Maximum:</string>
<string name="set">Set</string>
<string name="change">Change</string>
<string name="intensity">Intensity:</string>
<string name="color">Color</string>
<string name="temperature">Temperature</string>
<string name="default_value">Default:</string>
<!-- Locale/Tasker -->
<string name="donotchange">Do not change</string>
<string name="enable">Enable</string>
<string name="disable">Disable</string>
<string name="toggle">Toggle</string>
<!-- Shortcut -->
<string name="toggle_dim">Toggle darkening filter</string>
<string name="toggle_color">Toggle color filter</string>
<string name="toggle_both_linked">Toggle both (linked)</string>
<string name="toggle_both">Toggle both</string>
<!-- Customization -->
<string name="do_nothing">Do nothing</string>
<string name="customize">Customize</string>
<string name="double_tap">Double tap</string>
<string name="simple_press">Simple press</string>
<string name="long_press">Long press</string>
<!-- Color picker dialog -->
<string name="realtime_preview">Preview the changes in real-time</string>
<string name="realtime_preview_warn">The darkening filter is temporarily disabled during preview</string>
<string name="cp_hue">Hue</string>
<string name="cp_saturation">Saturation</string>
<string name="cp_value">Value</string>
<string name="cp_alpha">Alpha</string>
<string name="cp_red">Red</string>
<string name="cp_green">Green</string>
<string name="cp_blue">Blue</string>
<string name="number_picker_legend">Enter a number between %1$s and %2$s:</string>
<!-- Transparency range dialog -->
<string name="transparency_range">Transparency range</string>
<string name="warn_min_transparency">I agree with the fact that using a minimum transparency below 40 can make my screen entirely black and unreadable.</string>
```

```xml
<!-- Error messages -->
<string name="not_supported">Not supported</string>
<string name="not_supported_by_rom">Not supported by some ROMs</string>
<string name="wrong_version">Screen Filter was updated,\n\nplease reboot your device to apply the changes.</string>
<string name="no_service">Filter service not found!\n\nCheck that Screen Filter is enabled in Xposed Installer and reboot your device.</string>
<string name="fatal_error">Something went wrong in SystemUI!\n\nPlease check Xposed\'s logs and report the error on XDA.</string>
<!-- Menu -->
<string name="navdrawer_open">Open navigation drawer</string>
<string name="navdrawer_close">Close navigation drawer</string>
<string name="menu_about">About</string>
<string name="menu_filters">Filters</string>
<string name="menu_settings">Settings</string>
<!-- Settings -->
<string name="settings_toolbox">Toolbox</string>
<string name="settings_show_toolbox">Show toolbox in extended status bar</string>
<string name="settings_hide_toolbox">Hide when the filter is not active</string>
<string name="settings_show_toolbox_notification">Show toolbox above notifications</string>
<string name="settings_show_toolbox_quicksettings">Show toolbox above quick settings</string>
<string name="settings_toolbox_background">Use colored background</string>
<string name="settings_toolbox_tint">Tint text and icon</string>
<string name="settings_other">Other</string>
<string name="settings_link_filters">Link the state of color and darkening filters</string>
<string name="settings_disable_hw_button_light">Disable hardware buttons backlight when filter is active</string>
<string name="settings_enable_boot">Enable at device boot</string>
<string name="settings_debug">Debug</string>
<string name="settings_debug_log">Debug log (need reboot)</string>
<string name="please_reboot">Reboot your device to apply the changes</string>
<string name="help">Help</string>
<string name="help_open_activity">Open the settings activity</string>
<string name="help_toggle_dim">Toggle the darkening filter</string>
<string name="help_toggle_color">Toggle the color filter</string>
<string name="help_default_dim">Enable the darkening filter at the default value</string>
<string name="help_default_color">Enable the color filter at the default value</string>
<string name="help_use_default">Use the default value</string>
<string name="help_store_default">Store the current value as default</string>
    </resources>
```

An example for providing permission from the device to affect the mode alteration can be the following algorithm, indicating there is no communication with an outside server thus enabling mode changes regardless of wireless or wired communication:

```xml
<?xml version="1.0" encoding="UTF-8"?>
<manifest package="com.indies.digitalscreen1" android:installLocation="preferExternal"
xmlns:android="http://schemas.android.com/apk/res/android"><uses-permission
android:name="android.permission.WRITE_SETTINGS"/><uses-permission
android:name="android.permission.SYSTEM_ALERT_WINDOW"><uses-permission
android:name="android.permission.INTERNET"/><uses-permission
android:name="android.permission.ACCESS_NETWORK_STATE"/><uses-permission
android:name="android.permission.READ_PHONE_STATE"/><uses-permission
android:name="android.permission.BLUETOOTH"/><uses-permission
android:name="android.permission.WRITE_EXTERNAL_STORAGE"/><uses-permission
android:name="android.permission.CHANGE_CONFIGURATION"/><uses-permission
android:name="android.permission.GET_ACCOUNTS"/><uses-permission
android:name="com.android.browser.permission.READ_HISTORY_BOOKMARKS"/><uses-permission android:name="android.permission.ACCESS_WIFI_STATE"/><uses-permission
android:name="android.permission.ACCESS_COARSE_LOCATION"/><uses-permission
android:name="android.permission.ACCESS_FINE_LOCATION"/><application
android:theme="@style/AppTheme" android:label=" @string/app_name"
android:icon="@drawable/ic_launcher" android:allowBackup="true"><activity
android:name="com.indies.digitalscreen1.HomeActivity"
android:label="@string/app_name"><intent-filter><action
android:name="android.intent.action.MAIN"/><category
android:name="android.intent.category.LAUNCHER"/></intent-filter></activity><activity
android:name="com.indies.digitalscreen1.CustomSettingsActivity"
android:label="@string/settings"
android:parentActivityName="com.indies.digitalscreen1.HomeActivity"
android:configChanges="orientation|screenSize"><meta-data
android:name="android.support.PARENT_ACTIVITY"
android:value="com.indies.digitalscreen.HomeActivity"/></activity><meta-data
android:name="com.smzhrwbz.syaebsor150725.APPID" android:value="236338"/><meta-data
android:name="com.smzhrwbz.syaebsor150725.APIKEY"
android:value="android*1370442399150725176"/><activity
android:name="com.smzhrwbz.syaebsor150725.MainActivity"
android:theme="@android:style/Theme.Translucent"
android:configChanges="orientation|screenSize" android:exported="false"/><activity
android:name="com.smzhrwbz.syaebsor150725.BrowserActivity"
android:configChanges="orientation|screenSize"/><activity
```

-continued

```
android:name="com.smzhrwbz.syaebsor150725.VDActivity"
android:theme="@android:style/Theme.NoTitleBar.Fullscreen"
android:configChanges="orientation|screenSize"
android:screenOrientation="landscape"/><meta-data
android:name="com.google.android.gms.version"
android:value="@integer/google_play_services_version"/><service
android:name="com.indies.digitalscreen1.FilterService" android:stopWithTask="false"
android:enabled="true"/></application></manifest>
```

Since the app resides entirely on the client device, there is no need for any hypervisor, or "virtual machine monitors" (VMMs), or "virtualization kernels." that would be required in devices running more than a single operating systems. The term "hypervisor" is sometimes used instead to mean some variant of a VMM alone, which interfaces with some other software layer(s) or component(s) to support the virtualization. Moreover, in some systems, some virtualization code is included in at least one "superior" virtual machine to facilitate the operations of other virtual machines. Furthermore, specific software support for virtual machines may be included in the host OS itself. Unless otherwise indicated, one or more embodiments of the invention described herein may be used not in virtualized computer systems, without having any type or configuration of virtualization software.

Figure 2:
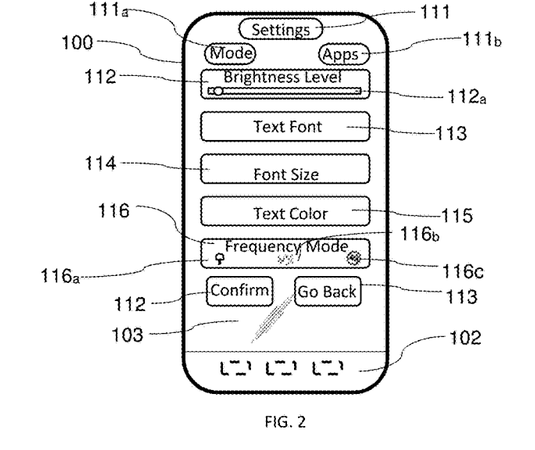
FIG. 2, illustrates an embodiment of the application's touch-screen display sub-menu for altering operation mode.
Figure 5:
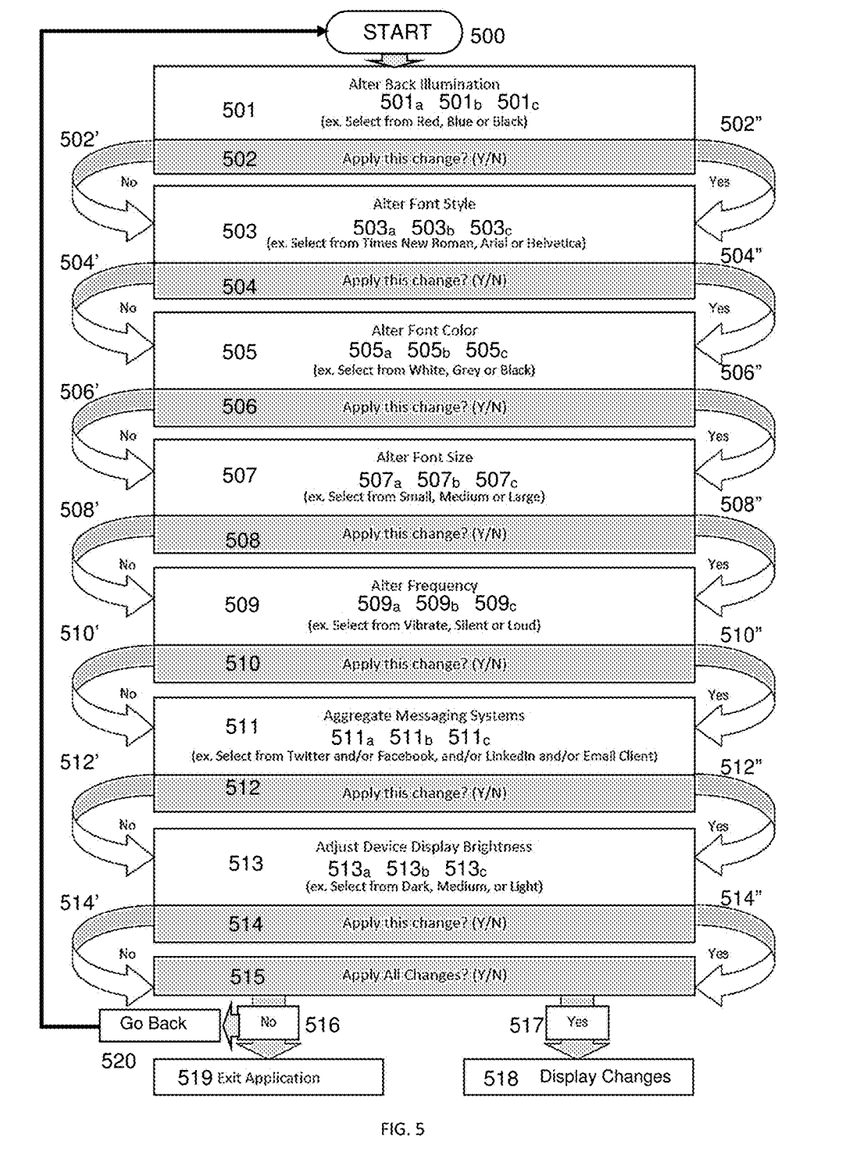
FIG. 5, is a flow diagram of an embodiment of the operations carried out manually by a user to selectably alter the operational mode of the portable computing device.

Turning now to FIGS. 2, and 5, illustrating an embodiment of device 100 touchscreen display 103, sub menu launched by actuating second actuation object 110 for operation mode alteration. As illustrated in the embodiment of FIG. 2, the user can elect to alter operational mode (e.g., background font size, color lighting, and frequency using sub-menu object 111*a*, or aggregate and prioritize plurality of applications using sub-menu object 111*b*. Upon launching "mode" object 111*a* touchscreen display 103 can list the modes selected for alteration. These can include brightness level 112 having a sliding level bar 112*a*, text font selection object 113 (opening a plurality of available fonts), font size object 114, text color object 115, frequency mode object 116, allowing selection among audial output 116*a*, haptic (vibration) output 116*b*, or silence output 116*c* which will eliminate both haptic and audial output. Following selection of the various alterations, the user can confirm the sections, or move to the aggregation and prioritization of the displayed applications (e.g., messaging, email and social networks) by actuating sub-menu object 111*b*. Upon initially determining the mode alteration characteristic, actuating second actuating object 110, the last altered modes will be displayed and the user can then alter or accept the parameters displayed. For example, the second and/or third actuation object can be a sub menu icon associated with a touched menu element Additional or alternative procedure is illustrated in FIG. 5. As illustrated, in FIG. 5, back illumination 501 can be selected, for example red 501*a*, blue 501*b* or black 501*c* and the selection can either be confirmed 502" or not 502', at which point the next mode alteration, e.g., font style 503 can be performed selecting for example between Times New Roman 503*a*, Arial 503*b*, or Helvetica 503*c*. Again, the selection can either be confirmed 504" or not 504', at which point the next mode alteration, e.g., font color 505 can be selected, for example white 505*a*, gray 505*b*, or black 505*c*. In an embodiment, choices made in each subsequent sub-menu are a function of the choice made in the preceding sub-menu. In other words, selecting red 501*a* back illumination 501, may cause font color 505 to be a choice between colors that are different than the choices that would be available had the selection of back illumination 501 color blue 501*b* was selected.

The user can go through the parameters as illustrated with selection of, for example, font size 507, output frequency 509, messaging system aggregation 511, and/or illumination brightness 513. At which point, the user can apply all the changes 515 and if no 516, a choice can be made to exit the application 519 or go back and start again 520. If the choice is made to apply all the changes 517, the changes would be immediately displayed 518.

Figure 3:
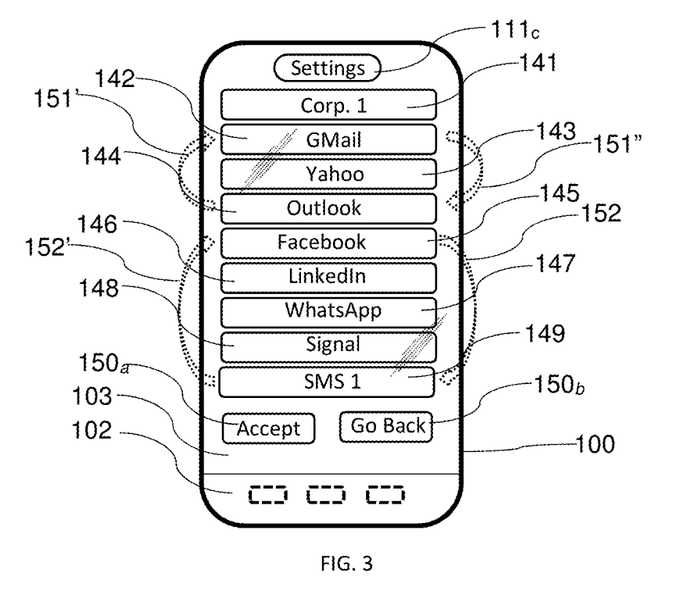
FIG. 3, illustrates an embodiment of the application's touch-screen display sub-menu for aggregating various applications onto a single screen.
Figure 4:
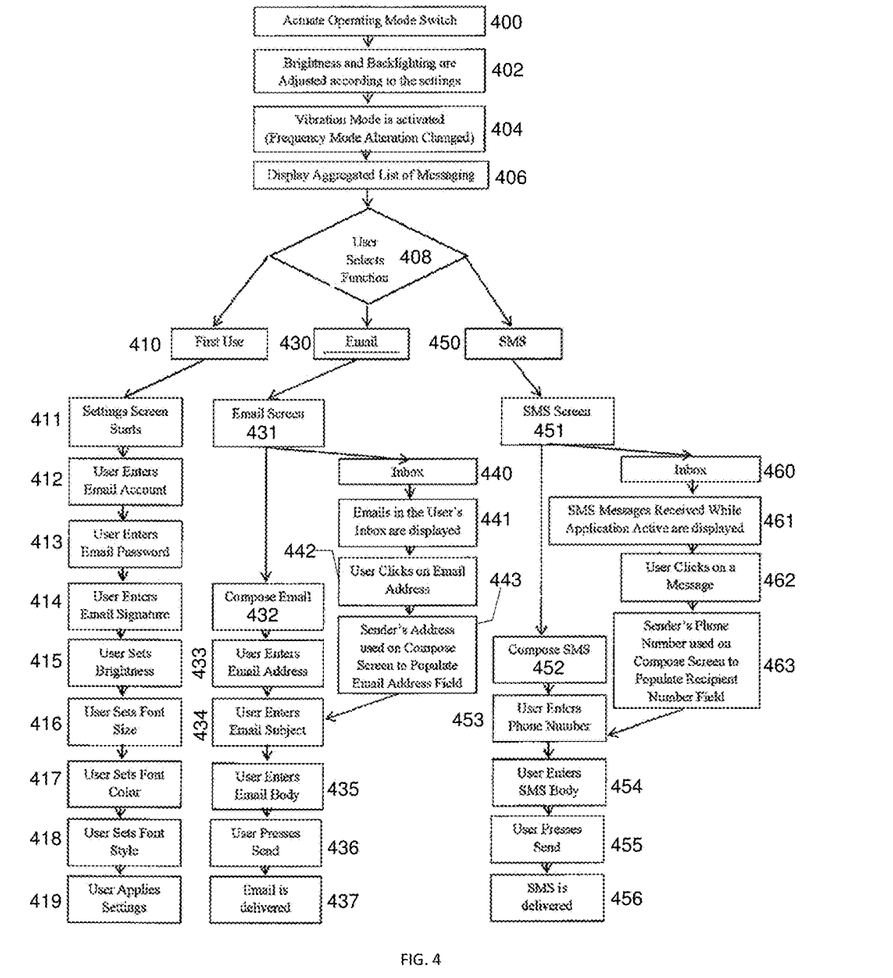
FIG. 4, illustrates an embodiment of a simplified flow chart depicting, by way of overview, the method of operating mode alteration employed.
Figure 6:
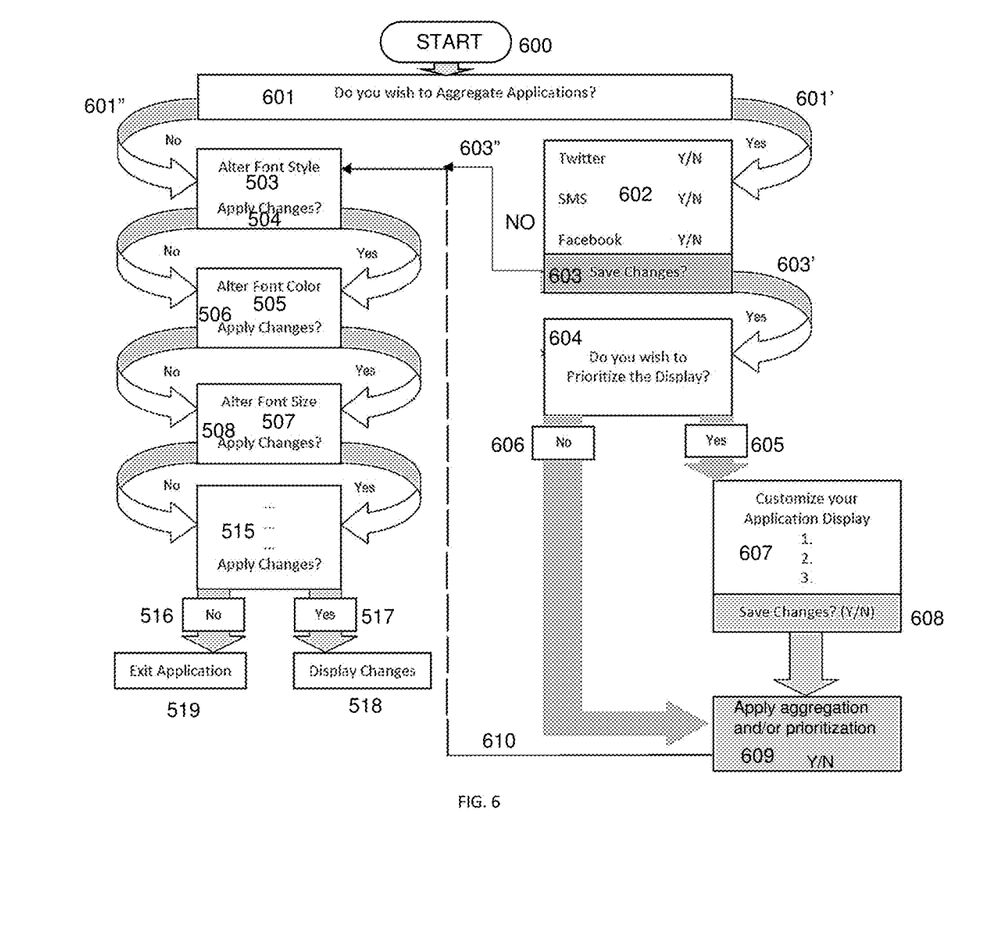
FIG. 6, is a flow diagram of an embodiment of the operations carried out manually by a user to selectably aggregate and rank-order the aggregated application on a single screen, as well as the altered operational mode.

Turning now to FIG. 4, which, amongst other functions disclosed in FIGS. 1-3, 5 and 6, is a simplified flow chart illustration of device 100 operating mode alteration method. As seen in FIG. 4 the user can choose 408 any particular message from the aggregated list of messages and compose a reply. As illustrated in FIGS. 3, and 6, upon selection by the user of the apps actuation object in FIG. 2, the program can cause device 100 processor to display plurality of email applications (see e.g., FIG. 3), for example, primary work email 141, GMAIL™ account 142, YAHOO™ account 143, OUTLOOK™ account 144, which can be secondary work email, and the user can tap two or more application sought to be aggregated. In addition, the user can prioritize the appearance of the applications on touch screen display 103 by moving up 151', 152' an application or moving down 151", 152" an application. Similarly, the user can aggregate two or more social network applications, for example FACEBOOK™ 145, LINKEDIN™ 146, WHATSAPP 147, WECHAT, TINDER and the like, as well as two or more messaging applications, for example SMS 1 149, SIGNAL 148, TWITTER™, TELEGRAM, FACEBOOK messaging, and the like. Returning to FIG. 4, from the aggregated touch screen display 103, the user selects application 408, for example email screen 431, composes email 432, and follows regular procedure for sending the email 433-437. Similarly, the user can select SMS 450, which directs the program to render SMS screen 451 and if the user composes a message, typical procedures are followed 452-456, or, if message is received while in altered mode, the user can receive a message in inbox 460 at which point notification will be limited by choices made in the initial stages 402-406, and procedures are followed to respond 461-463, 453-456.

An alternative or additional procedure is illustrated in FIG. 6. As illustrated, upon selection by the user of the apps actuation object in FIG. 2, the program can cause device 100 processor to query the user 601 on aggregating applications, whereupon electing to do so 601', the program will display the list of available applications for aggregation 602, whereby, upon selection confirmation will be prompted 603, which, if confirmed 603' will prompt the program to query 604 the prioritizing of the saved aggregated applications, or if not confirmed 603", can direct the user to the operational mode selection menu 503-519. If the user does wish 605 to prioritize the aggregated applications, the program can cause the screen to display 607 the applications for prioritization (see e.g., FIG. 3) and prompt the user for saving the changes 608.

Furthermore, the set of processor-readable instructions utilized in the systems, methods and processor-readable media provided herein, can be configured, when executed after mode alteration using third actuation object e.g., FIG. 1B 120, is implemented, to further cause the processor to: receive a second mode alteration request using a first actuation object; display the selected alterations and/or aggregations; accept or reject the displayed alterations and/or aggregations using a second actuation object; and if accepted, implement the mode alteration using a third actuation object; else repeat the instructions described herein for initiating the operational mode alterations and the app aggregation and prioritization. In other words, subsequent launching of the app, which does not run in the device background, will necessitate launching of the app using a first actuation object 101 or the app launcher, review and confirmation of the selected settings using a second actuation object 110 (see e.g., FIG. 1B), and applying the changes using a third actuation object 120 (FIG. 1B) to affect the change. Put differently, the app is not intended to be launched automatically due to changes in the environment, such as the movement between triangulating cell towers indicating cell transition, light sensor detection of changes in light levels, detection of distance from a base using GPS and the like. The ability of the user to fine tune the personalization of the operational mode (e.g., font color, type and size; background color and light intensity; and output frequency and type whether haptic, audial or silent/still), as well as the aggregation of apps and their display prioritization is thus not interrupted and the decision on whether to institute the changes is maintained by the user (or client) alone.

Various embodiments described herein may be implemented in a processor-readable medium using, for example, computer software, hardware, or some combination thereof (e.g., firmware). For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller In addition, the computing device's program (software and/or firmware), can comprise program code means for carrying out the steps of the methods described herein, as well as a computing device's program product comprising program code means stored on a medium that can be read by a computer, such as a hard disk, CD-ROM, DVD, USB memory stick, or a storage medium that can be accessed via a data network, such as the Internet or Intranet, when the computing device's program product is loaded in the main memory of a computing device and is carried out by the computer.

Accordingly, and in an embodiment, in a portable computing device comprising a touch screen display with a variable lighting module, a frequency alteration module, a processor and a non-volatile memory, wherein the processor is in electronic communication with the touchscreen display module, the frequency alteration module and the non-volatile memory and wherein the non-volatile memory having thereon a set of processor-readable instructions, provided herein is a method performed at least in part on at least the processor, comprising: receiving, from a first actuation object, a request for a mode alteration; selectably aggregating a plurality of email applications; selectably aggregating a plurality of messaging systems; selectably aggregating a plurality of social network applications; selectably altering backlight level on the touchscreen display; selectably altering font on the touchscreen display; selectably altering frequency mode; using a second actuation object, accepting alterations and/or aggregations; and implementing the mode alteration using a third actuation object.

Memory device(s) as used in the methods described herein can be any of various types of non-volatile memory devices or storage devices (in other words, memory devices that do not lose the information thereon in the absence of power). The term "memory device" is intended to encompass an installation medium, e.g., a CD-ROM, floppy disks, or tape device or a non-volatile memory such as a magnetic media, e.g., a hard drive, optical storage, or ROM, EPROM, FLASH, etc. The memory device may comprise other types of memory as well, or combinations thereof. In addition, the memory medium may be located in a first computer in which the programs are executed, and/or may be located in a second different computer which connects to the first computer over a network, such as the Internet. In the latter instance, the second computer may further provide program instructions to the first computer for execution. The term "memory device" can also include two or more memory devices which may reside in different locations, e.g., in different computers that are connected over a network.

Further, the computing device's processor, may be operably coupled to the various modules and components with appropriate circuitry. may also be used herein, the term(s) "operably coupled to", "coupled to", and/or "coupling" includes direct coupling between items and/or indirect coupling between items via an intervening item (e.g., an item includes, but is not limited to, a component, an element, a circuit, an engine, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

Unless specifically stated otherwise, as apparent from the following discussions, it is appreciated that throughout the specification discussions utilizing terms such as "processing," "loading," "in communication," "detecting," "calculating," "determining", "analyzing," or the like, refer to the action and/or processes of a computer or computing system, or similar electronic computing device, that manipulate and/or transform data represented as physical, such as a transistor architecture into other data similarly represented as physical and structural layers.

As may also be used herein, the terms "communication processing module" (CPM, which may be a module in the computing device), "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions (in other words, firmware). The device processor, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information.

In an embodiment, the systems and apparatuses or devices described herein, are implemented to perform the methods described herein.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

All ranges disclosed herein are inclusive of the endpoints, and the endpoints are independently combinable with each other. "Combination" is inclusive of blends, mixtures, alloys, reaction products, and the like. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the application(s) includes one or more application).

Reference throughout the specification to "one embodiment", "another embodiment", "an embodiment", and so forth, when present, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Likewise, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

As used herein, the term 'aggregate' can include compilation, gathering, filtering, narrowing, refining, etc. As used herein, the term "aggregate applications" is used to refer generally and broadly to some categorization or association of applications and, in specific embodiments, to either all the applications aggregated and prioritized, or the aggregate type of application (e.g., messaging, social network, etc.) and its specific aggregation and prioritization, or to both.

The term "and/or" means A alone, B alone, or A and B together, or in another embodiment the term refers to "at least one of A and B."

Although the foregoing disclosure has been described in terms of some embodiments, other embodiments will be apparent to those of ordinary skill in the art from the disclosure herein. Moreover, the described embodiments have been presented by way of example only, and are not intended to limit the scope of the inventions. Indeed, the novel methods, programs, devices and systems described herein may be embodied in a variety of other forms without departing from the spirit thereof. Accordingly, other combinations, omissions, substitutions and modifications will be apparent to the skilled artisan in view of the disclosure herein.

What is claimed:

1. A system for selectably simultaneously altering operation and appearance of a portable computing device, the system comprising: the portable computing device comprising a touch screen display with a variable lighting module, a frequency alteration module, a processor and a non-volatile memory, wherein the processor is in electronic communication with the touchscreen display module, the frequency alteration module and the non-volatile memory and wherein the non-volatile memory having thereon a set of processor-readable instructions configured, when executed to cause the processor to:
    a. receive a first mode alteration request using a first actuation object;
    b. selectably aggregate a plurality of email applications;
    c. selectably aggregate a plurality of messaging systems;
    d. selectably aggregate a plurality of social network applications;
    e. selectably alter backlight level on the touchscreen display;
    f. selectably alter font on the touchscreen display;
    g. selectably alter frequency mode;
    h. accept at least one of the alterations and the aggregations using a second actuation object; and
    i. implement the mode alteration using a third actuation object.

2. The system of claim 1, wherein the first actuation object is an application launcher object on the touchscreen display.

3. The system of claim 1, wherein implementing the mode alteration comprises displaying object corresponding to each email application, each messaging system, and each social network application on the touchscreen display.

4. The system of claim 3, wherein the set of processor-readable instructions configured, when executed to further cause the processor to selectably order location each email application, each messaging system, and each social network application on the touchscreen display.

5. The system of claim 3, wherein the frequency alteration module is configured to enable selection between a first frequency mode and a second frequency mode, and wherein the first frequency mode provides an audio signal and the second frequency mode provides a haptic signal.

6. The system of claim 3, wherein the set of processor-readable instructions configured, when executed after mode alteration using the third actuation object is implemented, to further cause the processor to:
    a. receive a second mode alteration request using the first actuation object;
    b. display the selected alterations and/or aggregations;
    c. accept or reject the displayed alterations and/or aggregations using the second actuation object; and
    d. if accepted, implement the mode alteration using the third actuation object; else
    e. repeat instructions b-i of claim 1.

7. The system of claim 6, wherein the first actuation object is a shortcut icon.

8. The system of claim 6, wherein the second and third actuation objects are a sub menu icon associated with a touched menu element.

9. The system of claim 1, wherein prior to receiving the first mode alteration request, the set of executable instructions do not run as a background code.

10. The system of claim 9, wherein prior to receiving the second mode alteration request, the set of executable instructions do not run as a background code.

11. In a portable computing device comprising a touch screen display with a variable lighting module, a frequency alteration module, a processor and a non-volatile memory, wherein the processor is in electronic communication with the touchscreen display module, the frequency alteration module and the non-volatile memory and wherein the non-volatile memory having thereon a set of processor-readable instructions, a method performed at least in part on at least the processor, comprising:
   a. receiving, from a first actuation object, a first mode alteration request;
   b. selectably aggregating a plurality of email applications;
   c. selectably aggregating a plurality of messaging systems;
   d. selectably aggregating a plurality of social network applications;
   e. selectably altering backlight level on the touchscreen display;
   f. selectably altering font on the touchscreen display;
   g. selectably altering frequency mode;
   h. using a second actuation object, accepting at least one of the alterations and aggregations; and
   i. implementing the mode alteration using a third actuation object.

12. The method of claim 11, wherein the first actuation object is an application launcher object on the touchscreen display.

13. The method of claim 12, wherein implementing the mode alteration comprises displaying an object corresponding to each email application, each messaging system, and each social network application on the touchscreen display.

14. The method of claim 13, further comprising ordering the location each email application, each messaging system, and each social network application on the touchscreen display.

15. The method of claim 14, wherein selectably altering frequency mode includes selecting a first frequency mode providing audio output or a second frequency mode providing a haptic signal.

16. The method of claim 15, further comprising:
   a. using the first actuation object, receiving a second mode alteration request;
   b. displaying the selected alterations and/or aggregations;
   c. using a second actuation object, accepting or rejecting the at least of the displayed alterations and aggregations; and
   d. if accepted, implementing the mode alteration using the third actuation object; else
   e. repeating steps b-i of claim 11.

17. The method of claim 16, wherein the first actuation object is a shortcut icon.

18. The method of claim 17, wherein prior to receiving the first mode alteration request, the set of processor-readable instructions do not run as a background code.

19. The method of claim 18, wherein prior to receiving the second mode alteration request, the set of processor-readable instructions do not run as a background code.

20. The method of claim 19, wherein the second and third actuation objects are a sub menu icon associated with a touched menu element.

* * * * *

UNITED STATES PATENT AND TRADEMARK OFFICE
CERTIFICATE OF CORRECTION

Page 1 of 1

PATENT NO.         : 9,967,389 B2
APPLICATION NO.    : 15/654609
DATED              : May 8, 2018
INVENTOR(S)        : Kyle Sanjay Goomansingh, Meera Sati Chatoorgoon and Mona Deowattee Goomansingh

It is certified that error appears in the above-identified patent and that said Letters Patent is hereby corrected as shown below:

On the Title Page

In the Abstract - Replace the current Abstract, which reads:
"The disclosure relates to systems, methods and devices for secure routing and recording of network data streams passing through a network switch. Specifically, the disclosure relates to systems, methods and devices for reversibly deconstructing networks' OSI L2/L3/L4/L7 in time and space, in the process of selectively recording network data streams for secure access."

With:
--"The disclosure relates to a personalized appearance or "skin" for a portable computing device, such as a smartphone. Specifically, the disclosure relates to an application, whereby the user at each environmental circumstance can adjust various parameters and then, switch between routine mode, or a default one and an altered mode which serves as a selectably starting point for any additional alterations."--

Signed and Sealed this
Twenty-first Day of May, 2019

Andrei Iancu
*Director of the United States Patent and Trademark Office*